United States Patent
Lee

(10) Patent No.: US 9,594,806 B1
(45) Date of Patent: Mar. 14, 2017

(54) DETECTING NAME-TRIGGERING QUERIES

(71) Applicant: Google Inc., Mountain View, CA (US)

(72) Inventor: John J. Lee, Long Island City, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/718,285

(22) Filed: May 21, 2015

Related U.S. Application Data

(63) Continuation of application No. 13/795,650, filed on Mar. 12, 2013, now Pat. No. 9,063,983.

(60) Provisional application No. 61/654,434, filed on Jun. 1, 2012, provisional application No. 61/654,518, filed on Jun. 1, 2012.

(51) Int. Cl.
  *G06F 17/00* (2006.01)
  *G06F 17/30* (2006.01)

(52) U.S. Cl.
  CPC ...... *G06F 17/3051* (2013.01); *G06F 17/3053* (2013.01); *G06F 17/30864* (2013.01)

(58) Field of Classification Search
  CPC ......... G06F 17/30067; G06F 17/30395; G06F 17/3053; G06F 17/3064; G06F 17/30707
  See application file for complete search history.

(56) References Cited

U.S. PATENT DOCUMENTS

| | | | |
|---|---|---|---|
| 7,536,382 B2 | 5/2009 | Zhou et al. | |
| 2004/0267721 A1 | 12/2004 | Meyerzon et al. | |
| 2006/0149606 A1* | 7/2006 | Goan, Jr. | G06F 17/30867 705/348 |
| 2009/0094178 A1* | 4/2009 | Aoki | G06F 17/30707 706/20 |
| 2010/0312778 A1* | 12/2010 | Lu | G06F 17/3064 707/759 |
| 2011/0184931 A1 | 7/2011 | Yechuri | |
| 2013/0036114 A1 | 2/2013 | Wong et al. | |

OTHER PUBLICATIONS

Office Action issued in U.S. Appl. No. 13/795,650 on Oct. 27, 2014, 18 pages.
Notice of Allowance issued in U.S. Appl. No. 13/795,650 on Mar. 11, 2015, 7 pages.

* cited by examiner

*Primary Examiner* — Truong Vo
(74) *Attorney, Agent, or Firm* — Fish & Richardson P.C.

(57) ABSTRACT

A system may be configured to receive a query; identify an object and a verb associated with the query; obtain information indicating a quantity of occurrences, in one or more documents, of the object in a sentence that may include the verb, or a quantity of occurrences, in one or more documents, of one or more terms, which are related to the object, in a sentence that may include the verb; generate a confidence score that may indicate a probability that the query seeks a result relating to a name of a person; identify a set of documents that are responsive to the query; determine that the confidence score satisfies a threshold; identify one or more documents, of the set of documents, that are associated with one or more names of people; select a particular document, of the set of documents; and output information regarding the selected particular document.

21 Claims, 14 Drawing Sheets

700

| Term | Related terms |
|---|---|
| Super Bowl | Sporting event, game, championship, football |
| French Open | Sporting event, game, championship, tennis |
| Titanic | Movie, drama, boat, ship, crash, disaster |
| Star Wars | Movie, science fiction, film, feature film |
| Gigli | Movie, romantic comedy |
| ... | ... |

FIG. 7

DETECTING NAME-TRIGGERING QUERIES

CROSS-REFERENCE TO RELATED APPLICATION

This application is a continuation of U.S. patent application Ser. No. 13/795,650, filed Mar. 12, 2013, which claims the benefit of U.S. Patent Application No. 61/654,434 filed Jun. 1, 2012, and U.S. Patent Application No. 61/654,518, filed Jun. 1, 2012, the contents of each are incorporated herein by reference.

BACKGROUND

User devices, such as mobile telephones, implement a variety of techniques through which users can find information. For example, some user devices implement dialog systems, which may be able to provide answers to questions provided by users. The answers to some questions may include a person's name, while answers to other questions may not include a person's name.

SUMMARY

According to some implementations, a method may include identifying an object and a verb associated with a query; obtaining information indicating at least one of a quantity of occurrences, in one or more documents, of the object in a sentence that may include the verb, or a quantity of occurrences, in one or more documents, of one or more terms, which are related to the object, in a sentence that may include the verb; generating, based on the obtained information, a confidence score that may indicate a probability that the query seeks a result relating to a name of a person; identifying a set of documents that are responsive to the query; determine that the confidence score satisfies a threshold; identifying, based on determining that the confidence score satisfies the threshold, one or more documents, of the set of documents, that are associated with one or more names of one or more people; selecting a particular document, of the set of documents; and outputting information regarding the selected particular document.

According to some implementations, generating the confidence score may include generating a first score that is based on the quantity of occurrences, in the one or more documents, of the object in a sentence that includes the verb and the quantity of occurrences, in the one or more documents, of one or more terms, which are related to the object, in a sentence that includes the verb, generating a second score that is based on the quantity of occurrences, in the one or more documents, of the object in a sentence that includes the verb, and is not based on the quantity of occurrences, in the one or more documents, of one or more terms, which are related to the object in a sentence that includes the verb, generating a third score that is based on the quantity of occurrences, in one or more documents, of one or more terms, which are related to the object, in a sentence that includes the verb, and is not based on the quantity of occurrences of the object in a sentence that includes the verb, and combining the first, second, and third scores to generate the confidence score.

According to some implementations, combining the first, second, and third scores may include calculating a weighted average of the first, second, and third scores, where at least two of the first score, the second score, and the third score are associated with different weights.

According to some implementations, the first score may be associated with a first weight, the second score may be associated with a second weight, and the third score may be associated with a third weight. The second weight may be greater than the first weight, and the first weight may be greater than the third weight.

According to some implementations, the method may include identifying a document score associated with each of the one or more documents that are associated with one or more names of one or more people; and adjusting the document score associated with each of the one or more documents that are associated with one or more names of one or more people. The selecting may be based on the adjusted document scores.

According to some implementations, determining that the confidence score satisfies the threshold includes determining that a response to the query includes a name of a person. Adjusting the document score associated with each of the one or more documents that are associated with one or more names of one or more people may include increasing the document score associated with each of the one or more documents that are associated with one or more names of one or more people, and selecting the particular document based on the adjusted scores may include determining that the particular document is associated with a highest document score of the document scores associated with the set of documents.

According to some implementations, the method may include decreasing the score associated with each of one or more documents that are not identified as being associated with one or more names of one or more people.

According to some implementations, determining that the confidence score satisfies the threshold includes determining that a response to the query does not include a name of a person. Adjusting the document score associated with each of the one or more documents that are associated with one or more names of one or more people may include decreasing the document score associated with each of the one or more documents that are associated with one or more names of one or more people, and selecting the particular document based on the adjusted document scores may include determining that the particular document is associated with a highest document score of the document scores associated with the set of documents.

According to some implementations, a method may include identifying one or more sentences within a document; and identifying one or more relations in the identified one or more sentences. A particular relation, of the one or more relations, may include a subject, an object, and a verb. The method may further include identifying whether the subject of the particular relation is associated with a name of a person; storing information associating the object, the verb, and an indication of whether the subject is associated with a name of a person; receiving a query; identifying that the query includes the verb; determine, based on the stored information associating the object, the verb, and the indication of whether the subject is associated with a name of a person, whether a response to the query is associated with a name of a person; and outputting, based on determining whether the response to the query is associated with a name of a person, information regarding a document that is responsive to the query.

According to some implementations, the method may include identifying one or more terms that are related to the object. Storing the information may include storing information associating the object, the verb, the indication of whether the subject is associated with the name of a person, and the one or more terms that are related to the object.

According to some implementations, determining, based on the stored information associating the object, the verb, and the indication of whether the subject is associated with a name of a person, whether a response to the query is associated with a name of a person, may include determining whether an object of the query is related to at least one of the one or more term that are related to the object of the particular relation, and determining whether the at least one of the one or more terms were previously identified as being associated with a name of a person.

According to some implementations, determining, based on the stored information associating the object, the verb, and the indication of whether the subject is associated with a name of a person, whether a response to the query is associated with a name of a person, may include determining whether an object of the query is a same object as the object included in the particular relation, and determining whether the object of the query was previously identified as being associated with a name of a person.

According to some implementations, the method may include identifying a group of documents that are responsive to the query; and identifying a group of scores that are each associated with one of the group of documents that are responsive to the query. Outputting information regarding the document that is responsive to the query may include identifying one or more documents, of the group of documents, that are associated with one or more names of one or more people; adjusting the score associated with each of the one or more documents that are associated with one or more names of one or more people; and selecting, as the document that is responsive to the query, a particular document, of the group of documents, based on the adjusted scores.

According to some implementations, the information associating the object, the verb, and the indication of whether the subject is associated with a name of a person may indicate at least one of a quantity of occurrences of the object occurring in a same relation as the verb.

The above discussion mentions examples in which some implementations may be implemented via one or more methods. In some implementations, one or more systems and/or devices may be configured to perform one or more of the acts mentioned above. In some implementations, a computer-readable medium may include computer-executable instructions which, when executed by one or more processors, cause the one or more processors to perform one or more of the acts mentioned above.

By identifying name-triggering queries, a system, according to one or more implementations described herein, may improve a user's experience by providing accurate answers to the user's questions. Furthermore, a system, according to one or more implementations described herein, may be able to avoid providing incorrect answers, such as answers that do not include the name of a person, to questions for which the answers should include the name of a person, and vice versa.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 7 illustrates an example data structure that may be stored by a related terms repository, according to one or more implementations described herein;

DETAILED DESCRIPTION

The following detailed description refers to the accompanying drawings. The same reference numbers in different drawings may identify the same or similar elements.

The concepts described herein may be applied to sets of documents. A document may be broadly interpreted to include any machine-readable and machine-storable work product. A document may include, for example, a web site, a file, a combination of files, one or more files with embedded links to other files, a news group posting, a news article, a blog, a business listing, an electronic version of printed text, a web advertisement, an e-mail, etc. In the context of the Internet, a common document is a web page. Documents often include textual information and may include embedded information, such as meta information, images, hyperlinks, etc., or embedded instructions, such as a script, etc. or both embedded information and embedded instructions.

A system and/or method, described herein, may enable one or more devices to identify name-triggering queries. That is, one or more devices, according to implementations described herein, may receive a query, and identify whether an appropriate response to the query includes a person's name. Additionally, or alternatively, one or more devices, according to implementations described herein, may determine whether an appropriate response to a query does not include a person's name. Further, in some implementations, one or more devices may provide a response to a query based on whether the query is a name-triggering query.

Figure 1A:
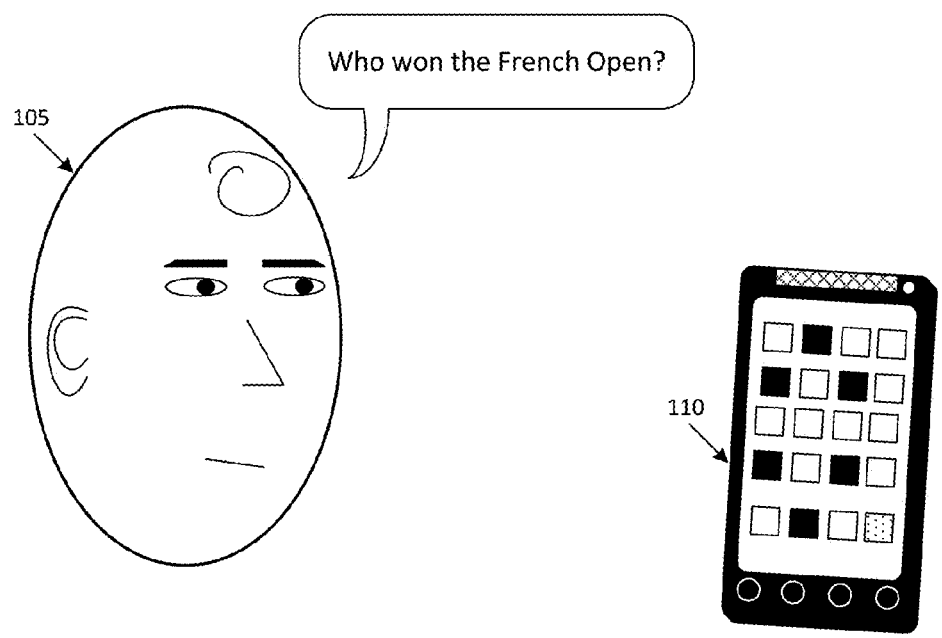
FIGS. 1A-2C illustrate an overview of example implementations described herein.
Figure 1B:
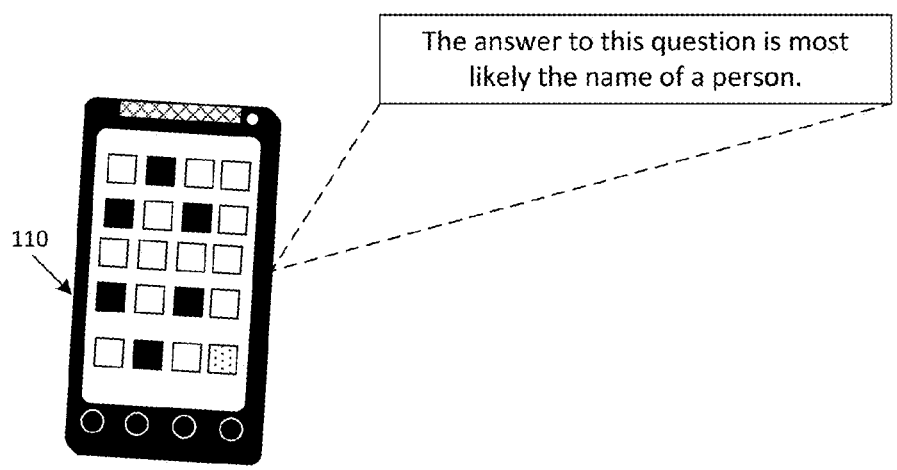
Figure 1C:
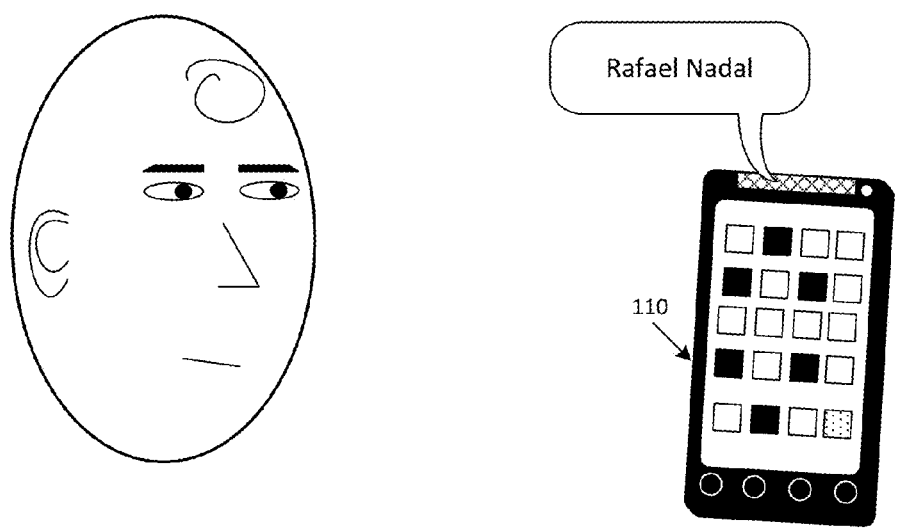

FIGS. 1A-20 illustrate an overview of example implementations described herein. For example, as shown in FIG. 1A, user 105 may ask a question, "Who won the French Open?" to user device 110. As shown in FIG. 1B, user device 110 may identify that an answer to the question "Who won the French Open?" is associated with a name of a person. In other words, user device 110 may identify that the question "Who won the French Open?" is a name-triggering query.

Figure 10:
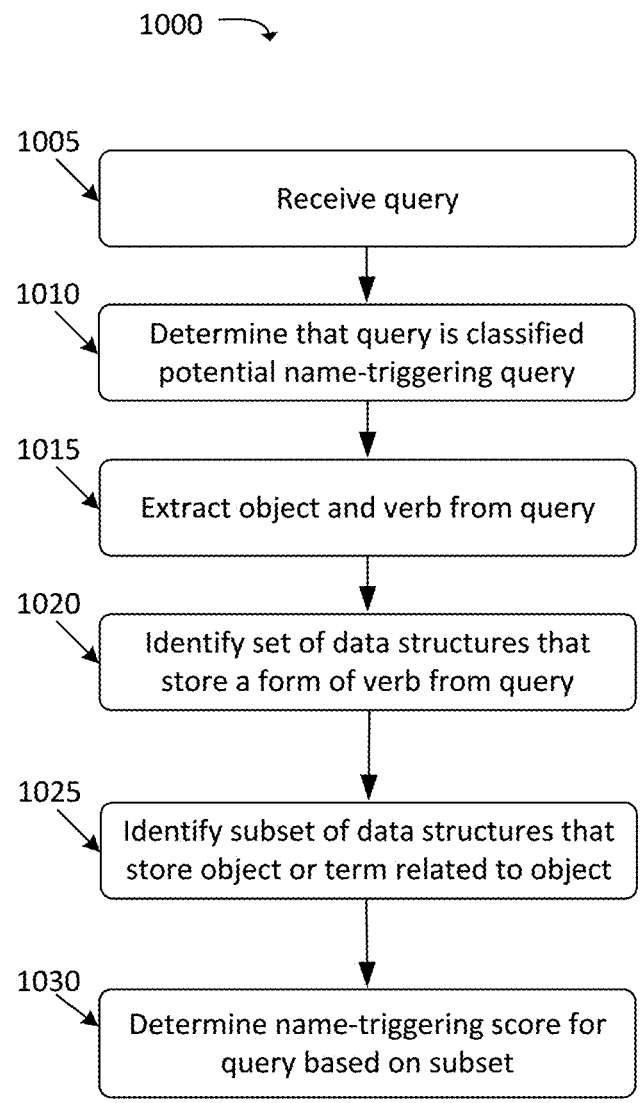
FIG. 10 illustrates a flowchart of an example process for using name-triggering information to output a result that is responsive to a query, according to one or more implementations described herein.

As shown in FIG. 10, user device 110 may output a response that is associated with the name of a person, "Rafael Nadal." User device 110 may output the name "Rafael Nadal" based on identifying that the question "Who won the French Open?" is a name-triggering query. As further discussed below, the response "Rafael Nadal" may be more heavily weighted than other potential responses—such as potential responses that are not associated with names of people—based on "Rafael Nadal" being the name of a person, and further based on identifying that the question "Who won the French Open?" is a name-triggering query.

Figure 2A:
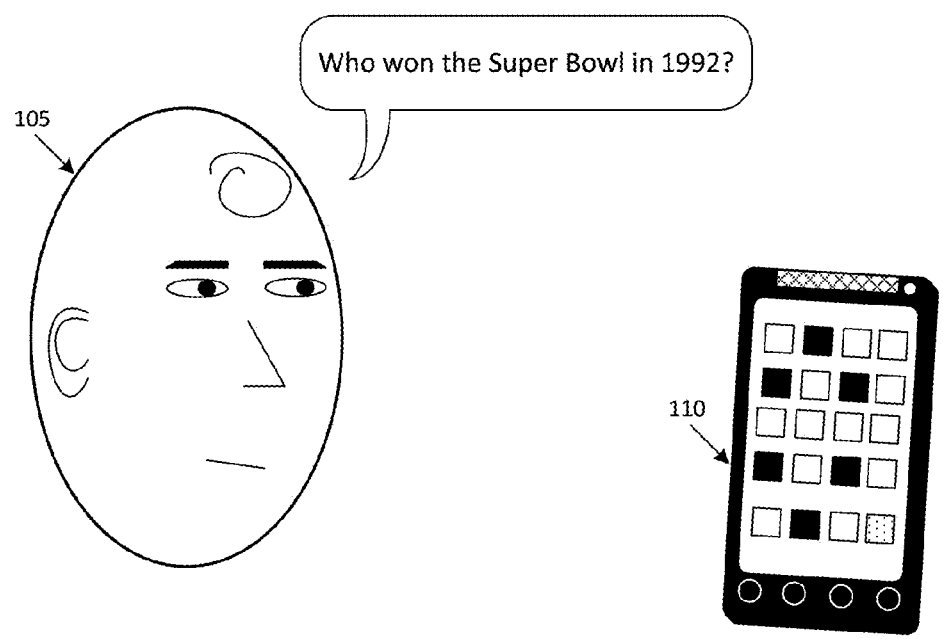
Figure 2B:
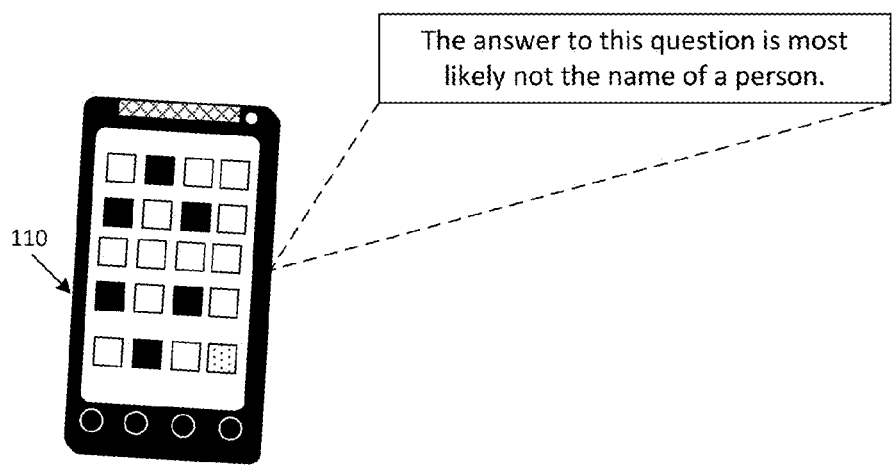

FIG. 2A illustrates user 105 asking a question, "Who won the Super Bowl in 1992?" to user device 110. As shown in FIG. 2B, user device 110 may identify that an answer to the question "Who won the Super Bowl in 1992?" is not associated with a name of a person. In other words, user device 110 may identify that the question "Who won the Super Bowl in 1992?" is not a name-triggering query.

Figure 2C:
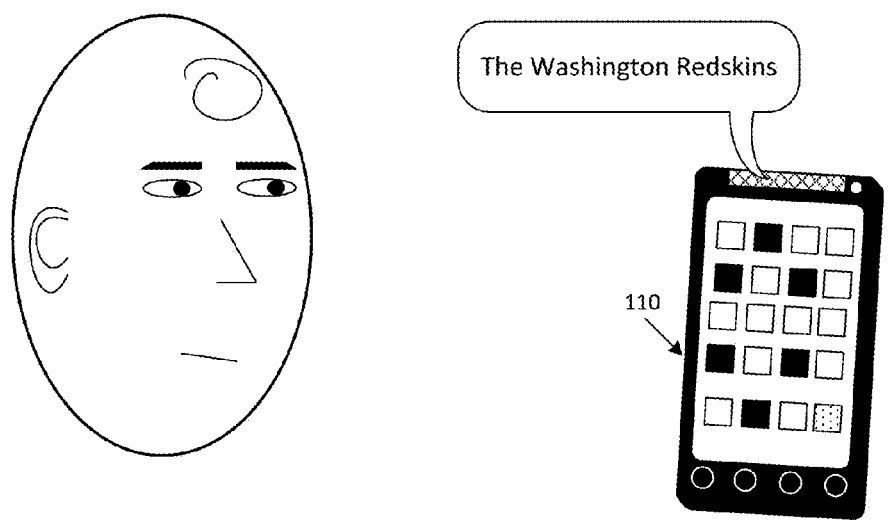

As shown in FIG. 2C, user device 110 may output a response that is not associated with the name of a person, "The Washington Redskins." User device 110 may output the response "The Washington Redskins" based on identifying that the question "Who won the Super Bowl in 1992?" is not a name-triggering query. As further discussed below, the response "The Washington Redskins" may be more heavily weighted than other potential responses—such as potential responses that are associated with names of people—based on "The Washington Redskins" not being the name of a person, and further based on identifying that the question "Who won the Super Bowl in 1992?" is not a name-triggering query.

Figure 3:
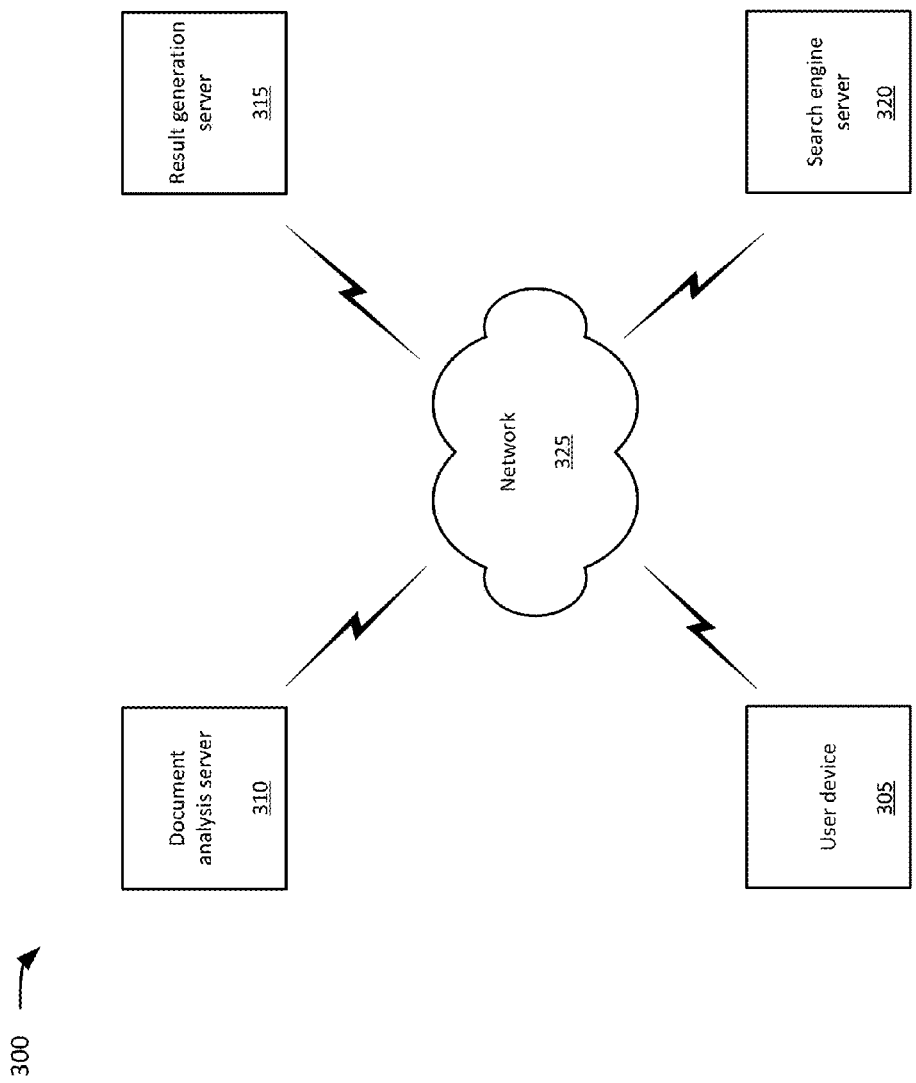
FIG. 3 illustrates an example environment in which systems and/or methods described herein may be implemented.

FIG. 3 is a diagram of an example environment 300 in which systems and/or methods described herein may be implemented. Environment 300 may include user device 305 and servers, such as document analysis server 310, result generation server 315, and search engine server 320, herein collectively referred to as "servers 310-320," connected to network 325. One user device 305 and three servers 310-320 have been illustrated as connected to network 325 for simplicity. In practice, environment 300 may include additional user devices and/or servers or fewer user devices and/or servers. Also, in some instances, a user device may perform a function of a server, and/or a server may perform a function of a user device.

User device 305 may implement one or more functions of user device 110. User device 305 may include a client device, such as a mobile telephone, a personal computer, a personal digital assistant ("PDA"), a tablet computer, a laptop, or any other type of computation or communication device. User device 305 may include audio input/output devices that allow a user to communicate with user device 305 via speech. For example, these audio input/output devices may include one or more microphones and/or one or more speakers. User device 305 may also include one or more visual input/output devices, such as one or more cameras and/or one or more screens that are capable of presenting a user interface via which a user may interact.

Servers 310-320 may each be implemented as a single server device or a collection of server devices that may be co-located or remotely located. Additionally, or alternatively, two or more of servers 310-320 may be implemented within a single, common server device or a single, common collection of server devices.

Document analysis server 310 may analyze documents in order to generate name-triggering information. As discussed below, name-triggering information may include information that indicates whether particular terms, such as terms that are located in or are associated with the analyzed documents, are associated with names of people.

Result generation server 315 may receive a query, e.g., from user device 305, and may output one or more results that are responsive to the query. In some implementations, result generation server 315 may use name-triggering information, e.g., name-triggering information generated by document analysis server 310, when outputting the one or more results. In such implementations, result generation server 315 may use the name-triggering information in order to determine whether the query is a name-triggering query, for which the response should be the name of a person.

Search engine server 320 may implement a search engine that receives queries, e.g., from user device 305 and/or from result generation server 315. Search engine server 320 may provide one or more results in response to the received queries. As further described below, result generation server 315 may use the one or more results, received from search engine server 320, when outputting a result that is responsive to the query. In such implementations, result generation server 315 may determine whether one or more results, received from search engine server 320, are associated with the name of a person.

Additional servers, implementing other functions, may also be implemented in environment 300. The additional servers may provide, for example, web content, payment services, shopping services, social networking services, etc.

Network 325 may include any type of network, such as a local area network ("LAN"), a wide area network ("WAN"), a telephone network—e.g., the Public Switched Telephone Network ("PSTN") or a cellular network—an intranet, the Internet, or a combination of networks. User device 305 and servers 310-320 may connect to network 325 via wired and/or wireless connections. In other words, user device 305 and/or any of servers 310-320 may connect to network 325 via a wired connection, a wireless connection, or a combination of a wired connection and a wireless connection.

Figure 4:
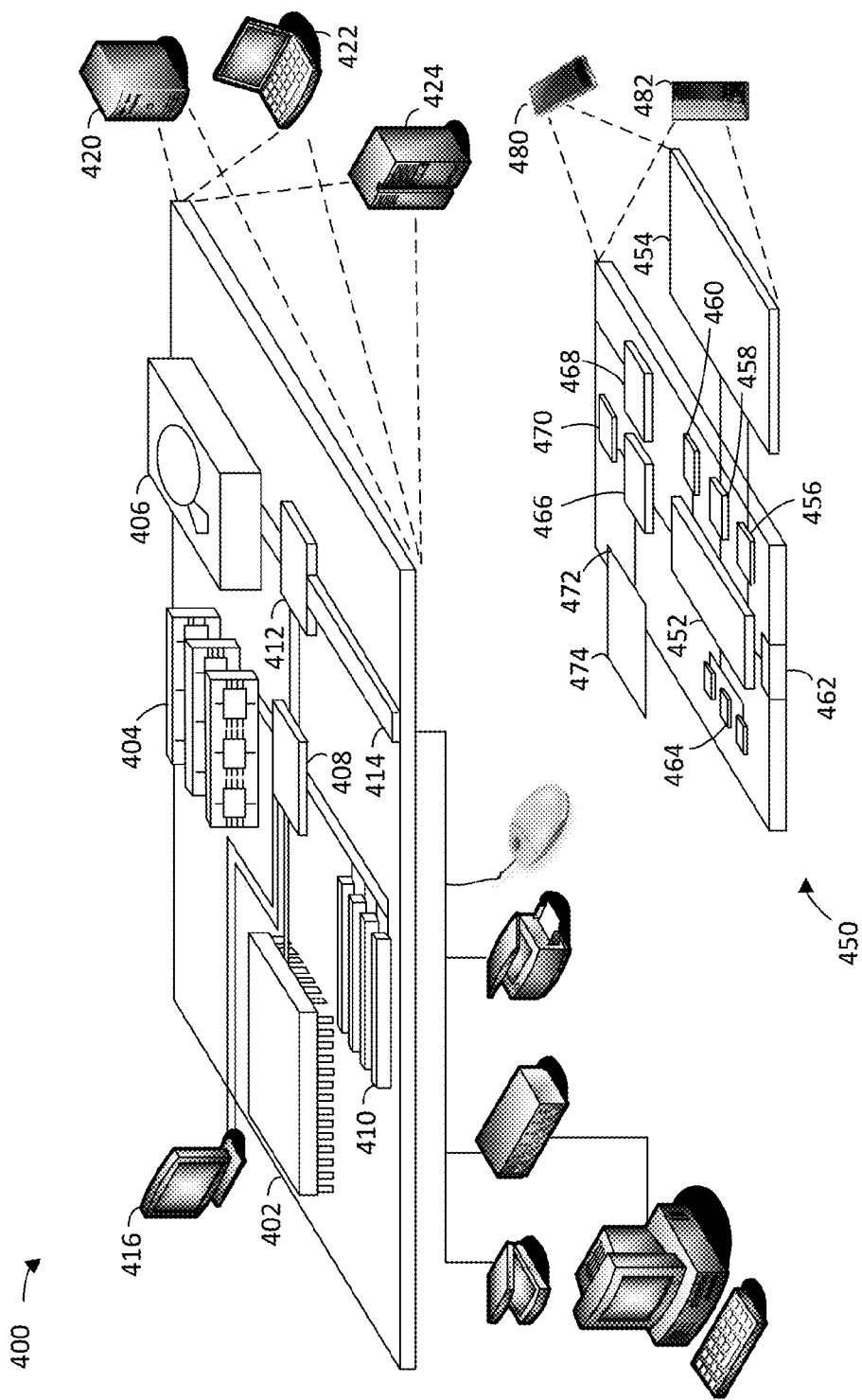
FIG. 4 shows an example of a generic computer device and a generic mobile computer device according to one or more implementations.

FIG. 4 shows an example of a generic computing device 400 and a generic mobile computing device 450, which may be used with the techniques described here. Computing device 400 and mobile computing device 450 may correspond to, for example, any of user device 305 and/or servers 310-320. Each of user device 305 and servers 310-320 may include one or more computing devices 400, mobile computing devices 450, or components of computing device 400 and/or mobile computing device 450.

Computing device 400 is intended to represent various forms of digital computers, such as laptops, desktops, workstations, personal digital assistants, servers, blade servers, mainframes, and other appropriate computers. Mobile computing device 450 is intended to represent various forms of mobile devices, such as personal digital assistants, cellular telephones, smart phones, and other similar computing devices. The components shown in FIG. 4, their connections and relationships, and their functions, are meant to be examples only, and are not meant to limit implementations of the inventions described and/or claimed in this document.

Computing device 400 may include a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. Processor 402 can process instructions for execution within the computing device 400, including instructions stored in the memory 404 or on the storage device 406 to display graphical information for a graphical user interface ("GUI") on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations, e.g., as a server bank, a group of blade servers, or a multi-processor system, etc.

Memory 404 stores information within the computing device 400. In some implementations, memory 404 includes a volatile memory unit or units. In another implementation, memory 404 includes a non-volatile memory unit or units. The memory 404 may also be another form of computer-readable medium, such as a magnetic or optical disk. A computer-readable medium may be defined as a non-transitory memory device. A memory device may include storage space within a single physical storage device or spread across multiple physical storage devices.

The storage device 406 is capable of providing mass storage for the computing device 400. In some implementations, storage device 406 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also include instructions that, when executed, perform one or more methods, such as those described herein. The information carrier is a computer or machine-readable medium, such as memory 404, storage device 406, or memory on processor 402.

High speed controller 408 manages bandwidth-intensive operations for the computing device 400, while low speed controller 412 manages lower bandwidth-intensive operations. Such allocation of functions is exemplary only. In some implementations, high-speed controller 408 is coupled to memory 404, display 416, e.g., through a graphics processor or accelerator, and to high-speed expansion ports 410, which may accept various expansion cards. In this implementation, low-speed controller 412 is coupled to storage device 406 and low-speed expansion port 414. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

Computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device, such as mobile computing device 450. Each of such devices may include one or more of computing devices 400, 450, and an entire system may be made up of multiple computing devices 400, 450 communicating with each other.

Mobile computing device 450 may include a processor 452, memory 464, an input/output ("I/O") device such as a display 454, a communication interface 466, and a transceiver 468, among other components. Mobile computing device 450 may also be provided with a storage device, such as a micro-drive or other device, to provide additional storage. Each of the components 450, 452, 464, 454, 466, and 468 are interconnected using various buses, and several of the components may be mounted on a common motherboard or in other manners as appropriate.

Processor 452 can execute instructions within mobile computing device 450, including instructions stored in memory 464. Processor 452 may be implemented as a chipset of chips that include separate and multiple analog and digital processors. Processor 452 may provide, for example, for coordination of the other components of mobile computing device 450, such as control of user interfaces, applications run by mobile computing device 450, and wireless communication by mobile computing device 450.

Processor 452 may communicate with a user through control interface 458 and display interface 456 coupled to a display 454. Display 454 may be, for example, a Thin-Film-Transistor Liquid Crystal Display ("TFT LCD") or an Organic Light Emitting Diode ("OLED") display, or other appropriate display technology. Display interface 456 may include appropriate circuitry for driving display 454 to present graphical and other information to a user. Control interface 458 may receive commands from a user and convert them for submission to the processor 452. In addition, an external interface 462 may be in communication with processor 452, so as to enable near area communication of mobile computing device 450 with other devices. External interface 462 may provide, for example, for wired communication in some implementations, or for wireless communication in other implementations, and multiple interfaces may also be used.

Memory 464 stores information within mobile computing device 450. Memory 464 can be implemented as one or more of a computer-readable medium or media, a volatile memory unit or units, or a non-volatile memory unit or units. Expansion memory 474 may also be provided and connected to mobile computing device 450 through expansion interface 472, which may include, for example, a Single In Line Memory Module ("SIMM") card interface. Such expansion memory 474 may provide extra storage space for device 450, or may also store applications or other information for mobile computing device 450. Specifically, expansion memory 474 may include instructions to carry out or supplement the processes described above, and may include secure information also. Thus, for example, expansion memory 474 may be provide as a security module for mobile computing device 450, and may be programmed with instructions that permit secure use of device 450. In addition, secure applications may be provided via the SIMM cards, along with additional information, such as placing identifying information on the SIMM card in a non-hackable manner.

Expansion memory 474 may include, for example, flash memory and/or NVRAM memory. In some implementations, a computer program product is tangibly embodied in an information carrier. The computer program product includes instructions that, when executed, perform one or more methods, such as those described above. The information carrier is a computer- or machine-readable medium, such as the memory 464, expansion memory 474, or memory on processor 452, that may be received, for example, over transceiver 468 or external interface 462.

Mobile computing device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver. In addition, Global Positioning System ("GPS") receiver module 470 may provide additional navigation- and location-related wireless data to mobile computing device 450, which may be used as appropriate by applications running on mobile computing device 450.

Mobile computing device 450 may also communicate audibly using audio codec 460, which may receive spoken information from a user and convert it to usable digital information. Audio codec 460 may likewise generate audible sound for a user, such as through a speaker, e.g., in a handset of mobile computing device 450. Such sound may include sound from voice telephone calls, may include recorded sound, e.g., voice messages, music files, etc., and may also include sound generated by applications operating on mobile computing device 450.

Mobile computing device 450 may be implemented in a number of different forms, as shown in the figure. For example, it may be implemented as a cellular telephone 480. It may also be implemented as part of a smart phone 482, personal digital assistant, or other similar mobile device.

Various implementations of the systems and techniques described herein can be realized in digital electronic circuitry, integrated circuitry, specially designed application specific integrated circuits ("ASICs"), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" and "computer-readable medium" refer to any non-transitory apparatus and/or device, e.g., magnetic discs, optical disks, memory, Programmable Logic Devices ("PLDs"), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device, e.g., a cathode ray tube ("CRT") or liquid crystal display ("LCD") monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described herein can be implemented in a computing system that includes a back end component, e.g., as a data server, or that includes a middleware component, e.g., an application server, or that includes a front end component, e.g., a client computer having a graphical user interface or a Web browser through which a user can interact with implementations of the systems and techniques described here, or any combination of such back end, middleware, or front end components. The components of the system can be interconnected by any form or medium of digital data communication, e.g., a communication network. Examples of communication networks include a LAN, a WAN, and the Internet.

Figure 5:
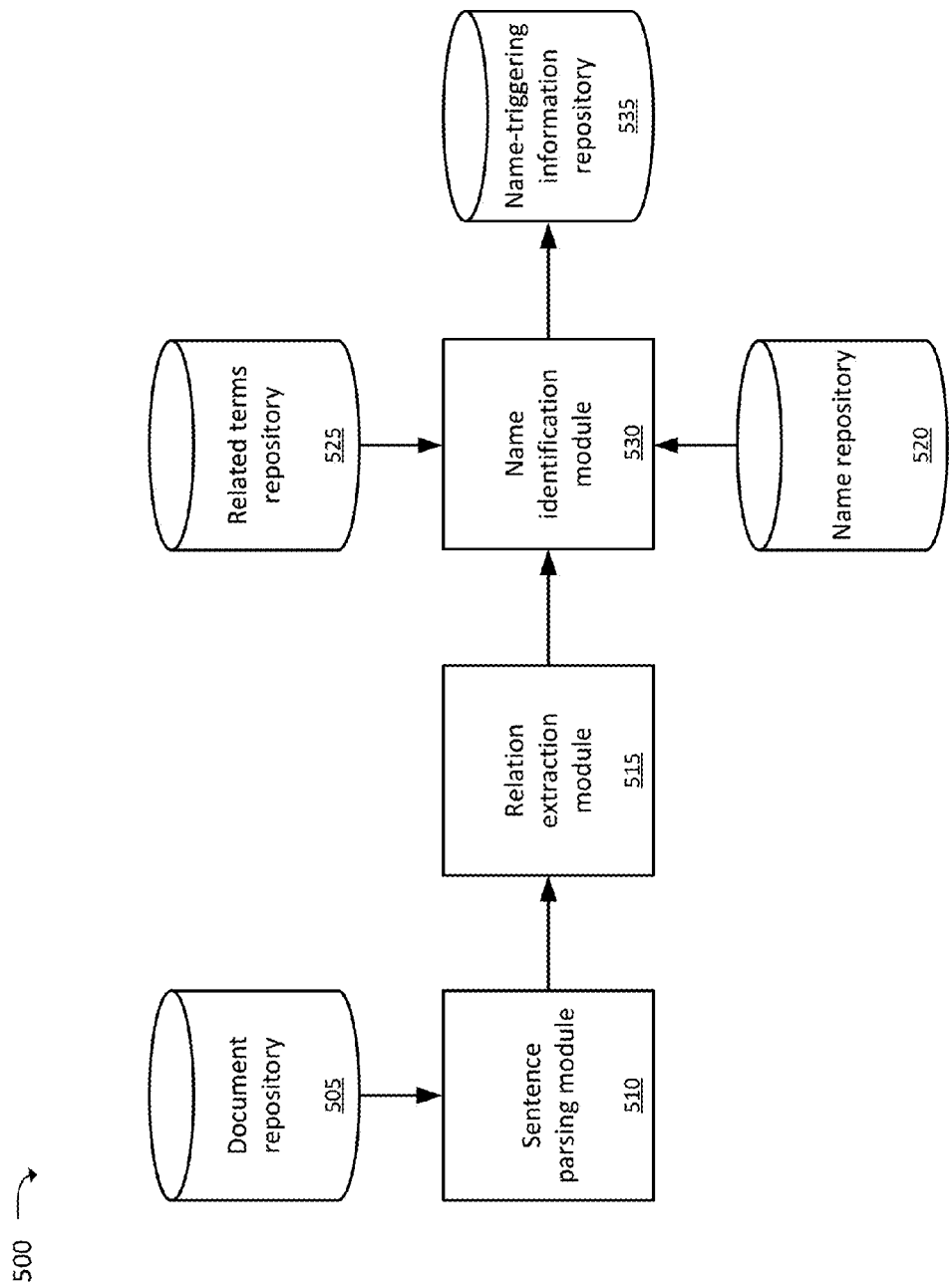
FIG. 5 illustrates example functional components of a document analysis server in accordance with one or more implementations.

FIG. 5 illustrates example functional components of an example system 500. In some implementations, system 500 may correspond to document analysis server 310. In other implementations, system 500 may additionally, or alternatively, correspond to one or more other devices shown in FIG. 3 and/or any other device.

As shown in FIG. 5, system 500 may include modules 505-535. Any, or all, of modules 505-535 may be implemented by one or more memory devices, such as memory 404 and/or memory 464, and/or one or more processors, such as processor 408 and/or processor 452. Furthermore, multiple modules may be associated with the same memory device and/or processor. For example, one memory device, or one set of memory devices, may store information associated with two or more of modules 505-535.

Document repository 505 may store information regarding one or more documents, such as web pages, news articles, product pages, blogs, or any other type of document. For example, document repository 505 may store content of a document, such as visible text, anchor link text, hyperlinks within the document, etc. In some implementations, document repository 505 may store a portion of content of a document, while omitting another portion of the content of the document. For example, in such implementations, document repository 505 may omit boilerplate content of a document, such as legal information, text that is less than a particular threshold font size, or any other boilerplate content. In some implementations, document repository 505 may store document content, while in another implementation, document repository 505 may store one or more references, such as links, to document content that is stored by one or more other devices.

Sentence parsing module 510 may receive information associated with one or more documents from document repository 505. For example, sentence parsing module 510 may receive content of a particular document from document repository 505. Sentence parsing module 510 may parse the content of the particular document in order to identify sentences in the content of the particular document. In some implementations, sentence parsing module 510 may identify sentences by identifying strings of characters that are separated by sentence-ending punctuation, such as, for example, a period, an exclamation point, or a question mark. Additionally, or alternatively, sentence parsing module 510 may use another technique to identify sentences, such as syntactical analysis, semantic analysis, or any other technique.

Relation extraction module 515 may extract relations from the sentences identified by sentence parsing module

510. A relation, as used herein, may include a subject, a verb, and an object. For example, assume that relation extraction module 515 receives the sentence "The man rode a bus" from sentence parsing module 510. Relation extraction module 515 may extract a relation from the sentence. The extracted relation may include the subject "man," the verb "rode," and the object "bus." This extracted relation may also be referred to as a "man-rode-bus" relation.

In some implementations, relation extraction module 515 may extract multiple relations from a single sentence. For example, assume that relation extraction module 515 receives the sentence "The dog ate my homework because he is a monster" from sentence parsing module 510. Relation extraction module 515 may extract a "dog-ate-homework" relation from this example sentence, and may also extract a "dog-is-monster" relation from the same sentence.

As is apparent from this example, relation extraction module 515 may, in some implementations, associate one or more terms of a relation with one or more other terms. For example, relation extraction module may detect a noun to which a pronoun refers. Referring back to the previous example, relation extraction module 515 may identify that the pronoun "he" refers to the noun "dog." Thus, when extracting the relation, relation extraction module 515 may extract the relation "dog-is-monster," instead of extracting the relation "he-is-monster." In alternative implementations, relation extraction module 515 may extract relations that include pronouns. For example, referring back to the above example, relation extraction module 515 may extract the relation "he-is-monster."

Additionally, or alternatively, relation extraction module 515 may detect an abbreviated form of a noun. For example, assume that relation extraction module 515 receives the sentence "Obama went to Harvard." In some implementations, relation extraction module 515 may identify that "Obama" is an abbreviated form of "Barack Obama," "President Barack Obama," "Barack Hussein Obama," or the like. Relation extraction module 515 may identify that "Obama" is an abbreviated noun by, for example, identifying "Obama" in a list of known nouns, identifying that "Obama" is related to another sentence received from the same document, and/or by some other technique.

Similarly, may identify that "Harvard" is an abbreviated form of "Harvard Law School," "Harvard University," or the like. Relation extraction module 515 may identify that "Harvard" is an abbreviated noun by, for example, identifying "Harvard" in a list of known nouns, identifying that "Harvard" is related to another sentence received from the same document, identifying that "Harvard Law School" is associated with "Obama," and/or by some other technique. Thus, in such an implementation, relation extraction module 515 may extract the example relation "Barack Obama-went-Harvard Law School." In alternative implementations, relation extraction module 515 may extract relations without performing such an analysis. For example, relation extraction module 515 may extract the relation "Obama-went-Harvard."

Name repository 520 may store information regarding names of one or more people. For example, name repository 520 may store names of actors, musicians, sports figures, political figures, celebrities, historical figures, or any other people. Name repository 520 may receive the information from any source, such as from a telephone directory, from one or more devices that automatically identify names of people, from one or more users, or from any other source.

Related terms repository 525 may store information relating terms to other terms. An example of such information is described below with respect to FIG. 7. Related terms repository 525 may receive the information from any source, such as from one or more devices that automatically identify terms that are related to each other, from one or more users, or from any other source.

Name identification module 530 may generate name-triggering information. As further discussed below, name-triggering information may identify terms that are associated with name-triggering queries. In order to generate name-triggering information, name identification module 530 may analyze a relation, such as a relation extracted by relation extraction module 515. When analyzing the relation, name identification module 530 may use information from name repository 520 to identify whether a subject of the relation is a name of a person. For example, for the relation "dog-ate-homework," name identification module 530 may identify that the relation is not associated with a name of a person. In another example, name identification module 530 may identify that the relation "Homer-eats-donuts" is associated with a name of a person.

Name identification module 530 may also use information from related terms repository 525 to identify additional terms associated with objects of analyzed relations. For example, related terms repository 525 may identify that the object "homework," in the example relation "dog-ate-homework," is associated with the example related terms "work," "assignment," and "schoolwork."

Name identification module 530 may use the analysis of a particular relation to generate name-triggering information for the particular relation. For example, the name-triggering information for the above example relation "dog-ate-homework" may identify that the verb of the relation is "ate," that the object is "homework," that terms related to the object are "work," "assignment," and "schoolwork," and that the relation is not associated with a name of a person.

Name-triggering information repository 535 may store name-triggering information. For example, name-triggering information repository 535 may receive name triggering information from name identification module 530. An example of name-triggering information stored by name-triggering information repository 535 is further described below with respect to FIG. 8.

Figure 6:
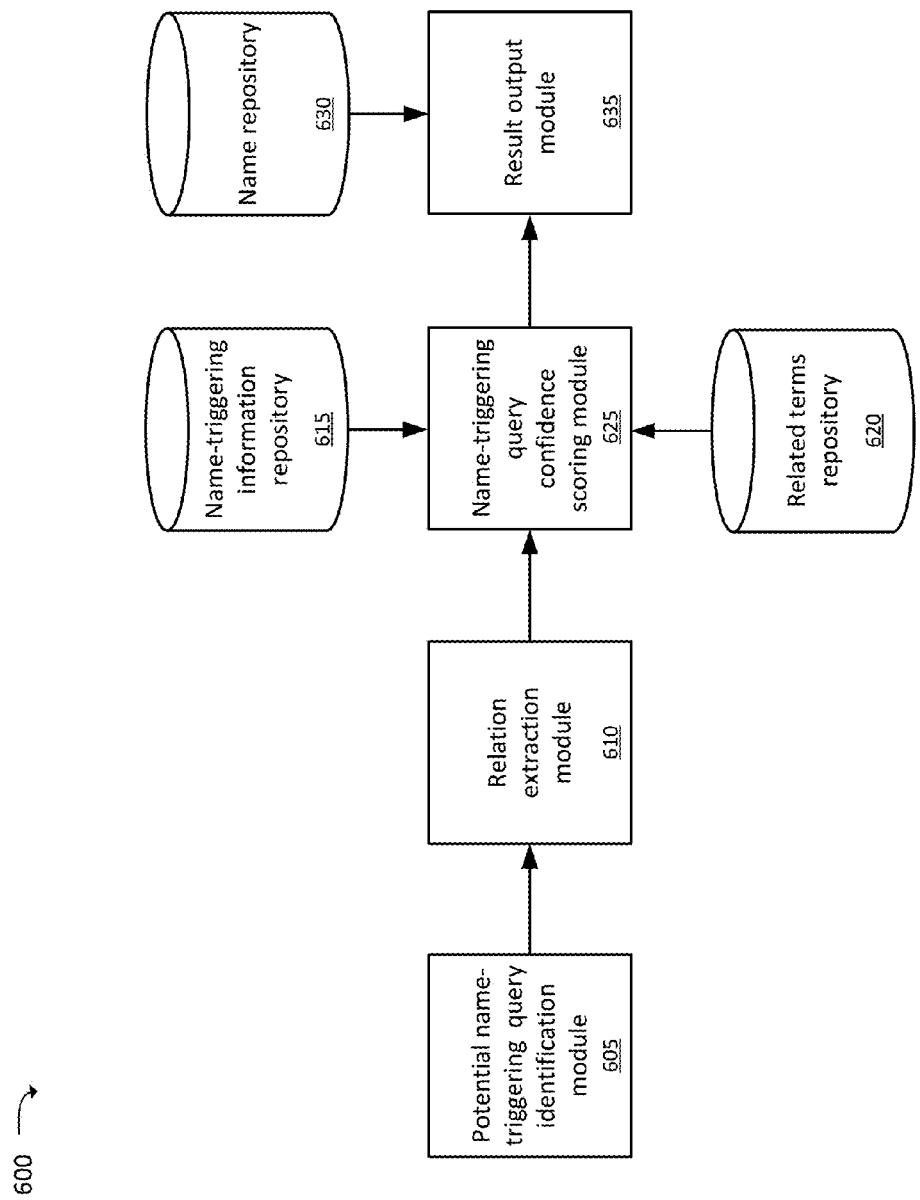
FIG. 6 illustrates example functional components of a result generation server in accordance with one or more implementations.

FIG. 6 illustrates example functional components of an example system 600. In some implementations, system 600 may correspond to result generation server 315. In other implementations, system 600 may additionally, or alternatively, correspond to one or more other devices shown in FIG. 3 and/or any other device. As shown in FIG. 6, system 600 may include modules 605-635. Any, or all, of modules 605-635 may be implemented by one or more memory devices, such as memory 404 and/or memory 464, and/or one or more processors, such as processor 408 and/or processor 452. Furthermore, multiple modules may be associated with the same memory device and/or processor. For example, one memory device, or one set of memory devices, may store information associated with two or more of modules 605-635.

Potential name-triggering query identification module 605 may receive a query, and determine whether the query is potentially a name-triggering query. In other words, potential name-triggering query identification module 605 may analyze the query in order to determine whether a response to the query may potentially include the name of a person. In order to do so, potential name-triggering query identification module 605 may determine whether the query includes one or more terms of a set of potential name-triggering terms. Potential name-triggering terms may include terms such as "who," "whom," "whose," "who's," "person," "guy," "man," "woman," kid," "boy," "girl," "name," or the like. Referring back to the example shown in FIG. 1A, potential name-triggering query identification module 605 may receive the query "Who won the French Open?" from user 105. Potential name-triggering query identification module 605 may determine that the query "Who won the French Open?" is a potential name-triggering query, because the query includes the term "who." Potential name-triggering query identification module 605 may receive the query from a user, such as a user of user device 305. The query may be provided via voice input, text input, or via any other technique.

Relation extraction module 610 may receive the query, and extract one or more relations from the query. In some implementations, the functionality of relation extraction module 610 may be similar to the functionality described above with respect to relation extraction module 515. Continuing with the example shown in FIG. 1A, relation extraction module 610 may extract, from the query, the relation "who-won-French Open."

Name-triggering information repository 615 may store name-triggering information. In some implementations, the functionality of name-triggering information repository 615 may be similar to the functionality described above with respect to name-triggering information repository 535. Related terms repository 620 may store information regarding terms that are related to each other. In some implementations, the functionality of related terms repository 620 may be similar to the functionality described above with respect to related terms repository 525.

Name-triggering query confidence scoring module 625 may determine a probability of whether a query is a name-triggering query. In other words, name-triggering query confidence scoring module 625 may determine whether a response to the query includes the name of a person. In some implementations, name-triggering query confidence scoring module 625 may determine whether a verb of a relation extracted by relation extraction module 610, an object of the relation, and/or a term that is related to the object of the relation, is associated with information stored by name-triggering information repository 615. The determination, made by name-triggering query confidence scoring module 625, is further described below with respect to FIGS. 10 and 11. Name-triggering query confidence scoring module 625 may generate a name-triggering score based on this determination. As described below, the name-triggering score may indicate a probability of whether the query is a name-triggering query.

Continuing with the above example, assume that name-triggering query confidence scoring module 625 identifies that an extracted relation is associated with the verb "won" and the object "French Open." Name-triggering query confidence scoring module 625 may identify information, stored by name-triggering information repository 615, that associates the verb "won" with various terms, and whether a particular association of the verb "won" with a particular term is associated with a name of a person. Based on this information, and as further described below, name-triggering query confidence scoring module 625 may determine that the query "Who won the French Open?" is likely a name-triggering query.

Name repository 630 may store information identifying names of one or more people. In some implementations, the functionality of name repository 630 may be similar to the functionality described above with respect to name repository 520.

Result output module 635 may output a result that is responsive to the query received by potential name-triggering query identification module 605, based on whether the query is a name-triggering query. Result output module 635 may, in some implementations, receive information identifying one or more results from, for example, a search engine, that are responsive to the query. The results may include documents, such as web documents, news articles, product pages, blogs, or any other type of document. The results may be associated with scores that are based on, for example, a measure of relevance of the results to the query, a measure of quality of the results, an age of documents associated with the results, an amount of traffic to and/or from documents associated with the results, or any other characteristic of the results.

Result output module 635 may receive an indication from name-triggering query confidence scoring module 625 identifying whether the query is a name-triggering query. Assume, for instance, that result output module 635 receives an indication that the query is a name-triggering query. Result output module 635 may select a result based on the query being a name-triggering query. For example, result output module 635 may identify a result, of the received results, that is associated with a highest score and is associated with the name of a person. Additionally, or alternatively, result output module 635 may adjust the scores associated with the received results based on whether the received results are associated with names of people and based on whether the query is a name-triggering query. For example, result output module 635 may increase a score of a result associated with the name of a person and/or decrease a score of a result that is not associated with the name of a person when the query is a name-triggering query. In such implementations, result output module 635 may select a result based on the adjusted scores. Result output module 635 may output the result, e.g., to a user device, such as to user device 305.

FIG. 7 illustrates an example data structure 700 that may be stored by a related terms repository, such as one or more devices that implement related terms repository 525 and/or related terms repository 620. Data structure 700 may associate terms, such as terms that appear in documents, with related terms.

Each row may be associated with a particular term. As described above, these terms may be identified by relation extraction module 515 as being objects in relations extracted from documents. For example, the rows shown in example data structure 700 are associated with the terms "Super Bowl," "French Open," "Titanic," "Star Wars," and "Gigli." Data structure 700 indicates that the terms "sporting event," "game," "championship," and "football" are related to the term "Super Bowl," that the terms "sporting event," "game," "championship," and "tennis" are related to the term "French Open," that the terms "movie," "drama," "boat," "ship," "crash," and "disaster" are related to the term "Titanic," that the terms "movie," "science fiction," "film," and "feature film," are related to the term "Star Wars," and that the terms "movie" and "romantic comedy" are related to the term "Gigli."

Figure 8:
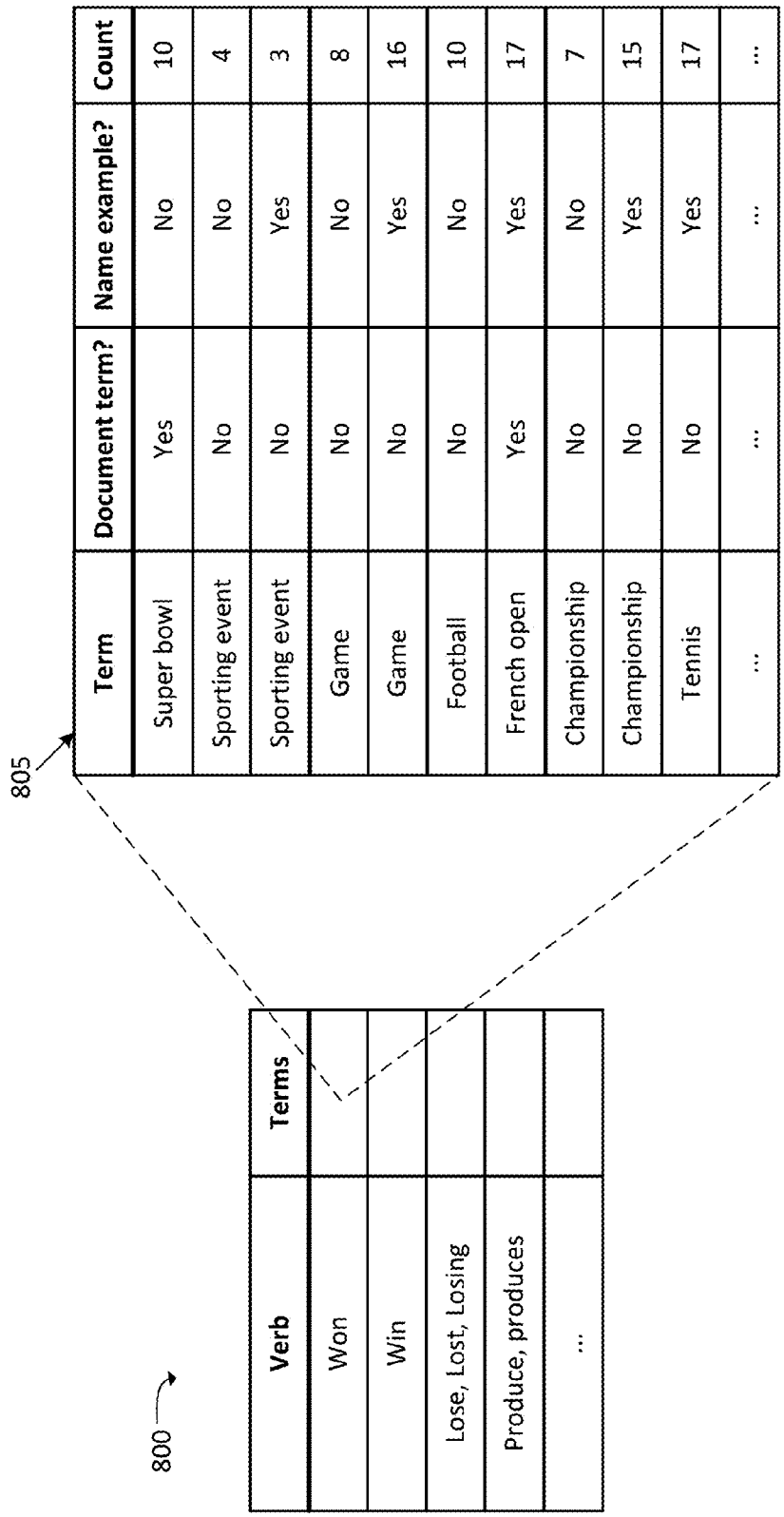
FIG. 8 illustrates an example data structure that may be stored by a name-triggering information repository, according to one or more implementations described herein.

FIG. 8 illustrates an example data structure 800 that may be stored by a name-triggering information repository, such as one or more devices that implement name-triggering information repository 535 and/or name-triggering information repository 615. Data structure 800 may associate verbs with terms, and whether a particular association is associated with the name of a person.

Data structure 800 may include an entry for each verb, or set of verbs, stored by data structure 800. For example, data structure may include an entry for the verb "won," an entry for the verb "win," an entry for the verbs "lose," "lost," and "losing," etc. FIG. 8 illustrates an example entry 805 that is associated with the verb "won."

Entry 805 may include multiple rows and columns. The columns may include a "term" column, a "document term?" column, a "name example?" column, and a "count" column. The "term" column may indicate a term associated with a particular row of entry 805. Terms, identified by the "term" column, may be terms that are objects of relations that are extracted from documents, and/or terms related to objects of relations that are extracted from documents. For example, as shown in FIG. 8, a row of entry 805 may be associated with the term "Super Bowl."

The "document term?" column may indicate whether an instance of occurrence of a particular term is an occurrence of the particular term as an object of a relation that is extracted from a document by, e.g., relation extraction module 515, or as a term, stored by, e.g., related terms repository 525, that is related to an object of a relation that is extracted from a document. For example, as shown in FIG. 8, the "document term?" column associated with the term "Super Bowl" may indicate an instance of occurrence of the term "Super Bowl" as an object of a relation that was extracted from a document. As further shown in FIG. 8, the "document term?" column associated with the term "football" may indicate an instance of occurrence of the term "football" as a term that is related to an object of a relation that was extracted from a document. In other words, in the example shown in FIG. 8, a "yes" entry for "document term?" may indicate an instance of occurrence of a term as an object of a relation that was extracted from a document, while a "no" entry for "document term?" may indicate an instance of occurrence of the term as a term that is related to an object of a relation that was extracted from a document.

The "name example?" column may indicate whether an instance of occurrence of a particular term has been identified in a relation that includes a person's name. For example, as shown in FIG. 8, the "name example?" column associated with the term "Super Bowl" indicates that the term "Super Bowl" has not been identified as being associated with a relation that includes a person's name. Such a relation may be, for example, "Redskins-won-Super Bowl." On the other hand, the "name example?" column associated with the term "French Open" indicates that the term "French Open" has been identified as being associated with a relation that includes a person's name. Such a relation may be, for example, "Rafael Nadal-won-French Open."

The "count" column may indicate a quantity of occurrences of a particular term as a document term and/or as an instance of occurrence associated with a name of a person. For example, the "count" column associated with the term "Super Bowl" may indicate that the term "Super Bowl" occurred ten times as an object of relations extracted from documents, when these occurrences were not associated with a name of a person.

As is apparent from FIG. 8, entry 805 may include multiple rows that are each associated with the same term. For example, the term "sporting event" occurs in two rows in the example shown in FIG. 8. In this example, one row may indicate four instances of occurrence of the term "sporting event" as a term that is related to an object of a relation extracted from a document, and that these four occurrences are not associated with a name of a person. Further, another row may indicate three instances of occurrence of the term "sporting event" as a term that is related to an object of a relation extracted from a document, and that these three occurrences are associated with a name of a person.

While data structures 700 and 800 are represented in FIGS. 7 and 8, respectively, as tables with rows and columns, in practice, data structures 700 and 800 may include any type of data structure, such as a linked list, a tree, a hash table, a database, or any other type of data structure. Furthermore, while specific example rows and columns are illustrated in FIGS. 7, and 8, other implementations may represent some or all of the example information shown in FIGS. 7 and 8 using other representations. Data structures 700 and/or 800 may include information generated by or received from any source, such as information provided by one or more users, and/or information automatically provided by one or more devices, such as one or more devices shown in FIG. 3.

Figure 9:
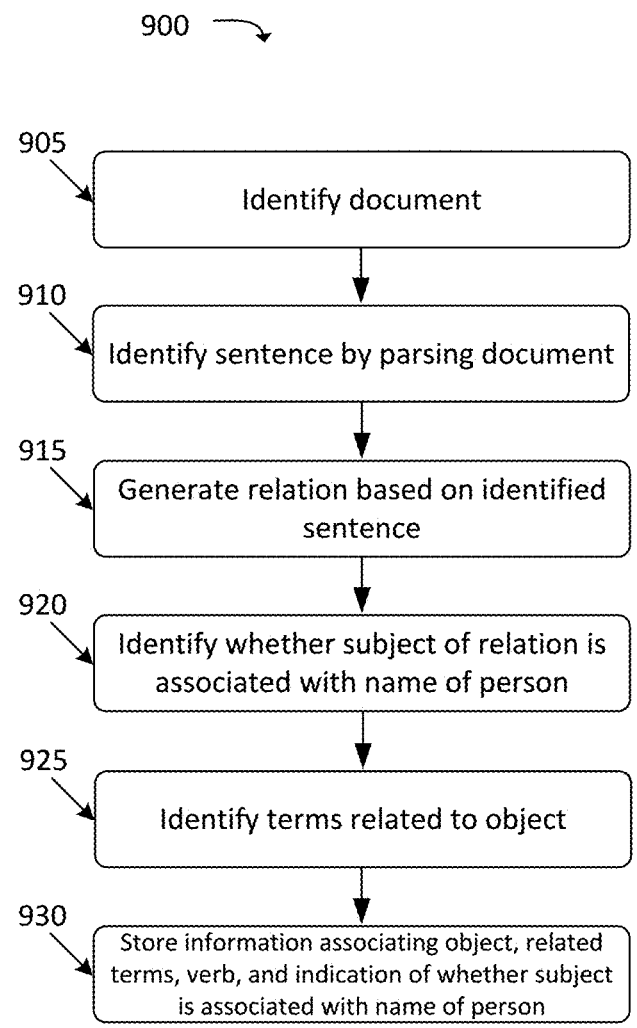
FIG. 9 illustrates a flowchart of an example process for generating name-triggering information, according to one or more implementations described herein.

FIG. 9 illustrates a flowchart of an example process 900 for generating name-triggering information. In some implementations, process 900 may be performed by document analysis server 310. In another implementation, process 900 may be performed by one or more other components instead of, or possibly in conjunction with, document analysis server 310.

Process 900 may include identifying a document (block 905). For example, as described above with respect to document repository 505, document analysis server 310 may identify a document out of a group of stored documents.

Process 900 may further include identifying a sentence by parsing the document (block 910). For example, as described above with respect to sentence parsing module 510, document analysis server 310 may parse the document identified at block 905 in order to identify one or more sentences in the document. For example, document analysis server 310 may identify the sentence "The Redskins are a team, and they won the Super Bowl."

Process 900 may additionally include generating a relation based on the identified sentence (block 915). For example, as described above with respect to relation extraction module 515, document analysis server 310 may extract one or more relations from the document, which may include a subject, a verb, and an object. Continuing with the above example, document analysis server 310 may extract the relations "Redskins-are-team" and "Redskins-won-Super Bowl."

Process 900 may also include identifying whether a subject of the relation is associated with a name of a person (block 920). For example, as described above with respect to name repository 520 and name identification module 530, document analysis server 310 may determine whether subjects of the one or more relations extracted at block 915 are associated with a name of a person. Continuing with the above example, document analysis server 310 may identify that both of the relations "Redskins-are-team" and "Redskins-won-Super Bowl" are not associated with a name of a person.

Process 900 may further include identifying terms related to an object of the relation (block 925). For example, as described above with respect to related terms repository 525 and name identification module 530, document analysis server 310 may identify one or more related terms associated with an object of the one or more relations extracted at block 915. Continuing with the above example, and further referring to the example information shown in FIG. 7, document analysis server 310 may identify that the terms "sporting event," "game," "championship," and "football" are related to the term "Super Bowl."

Process 900 may additionally include storing information associating the object, related terms, the verb of the relation, and an indication of whether the subject is associated with a name of a person (block 930). For example, as described above with respect to name identification module 530 and name-triggering information repository 535, document analysis server 310 may store name-triggering information. Continuing with the above example, and further referring to the example information shown in FIG. 8, document analysis server 310 may store information indicating that the term "Super Bowl" was identified as occurring in an object of a relation that includes the verb "won," and that the occurrence is not associated with a name of a person. As also shown in FIG. 8, document analysis server 310 may also store similar information associated with terms that are related to the term "Super Bowl." As described above with respect to FIG. 8, data structure 800 may store information that identifies a quantity of occurrences of terms and related terms. When storing the information (at block 930), document analysis server 310 may increment the information identifying the quantity of occurrences of terms and related terms.

FIG. 10 illustrates a flowchart of an example process 1000 for using name-triggering information to output a result that is responsive to a query. In some implementations, process 1000 may be performed by result generation server 315. In another implementation, process 1000 may be performed by one or more other components instead of, or possibly in conjunction with, result generation server 315.

Process 1000 may include receiving a query (block 1005). For example, result generation server 315 may receive a query from, e.g., a user of user device 305. Referring to the example shown in FIG. 2A, result generation server 315 may receive the query "Who won the Super Bowl in 1992?"

Process 1000 may further include determining that the query is classified a potential name-triggering query (block 1010). For example, as described above with respect to potential name-triggering query identification module 605, result generation server 315 may determine whether the query received at block 1005 is classified a potential name-triggering query. Result generation server 315 may base this determination on, for example, whether the query includes a name-triggering term, such as "who," "whom," "whose," "who's," "person," "guy," "man," "woman," kid," "boy," "girl," "name," or the like. Continuing with the above example, result generation server 315 may identify that the query "Who won the Super Bowl in 1992?" is classified as a potential name-triggering query because the query includes the term "who."

Process 1000 may additionally include extracting an object and a verb from the query (block 1015). Process 1000 may extract an object and a verb based on determining that the query was classified as a potential name-triggering query. For example, as described above with respect to relation extraction module 610, result generation server 315 may extract a relation from the query received at block 1005, and identify an object and a verb from the query. Continuing with the above example, result generation server 315 may extract the relation "who-won-Super Bowl" from the query "Who won the Super Bowl in 1992?" Result generation server 315 may identify that the object of the query is "Super Bowl" and that the verb of the query is "won."

Process 1000 may also include identifying a set of data structures that store a form of the verb from the query (block 1020). For example, name-triggering query confidence scoring module 625 of result generation server 315 may identify a set of data structures that store a form of the verb and that are stored by a data structure repository, such as one or more devices implementing name-triggering information repository 615. In some implementations, result generation server 315 may identify all instances of name-triggering information, stored by the name-triggering information repository, that are associated with the verb of the query. In some implementations, result generation server 315 may identify instances of name-triggering information that are associated with different conjugations of the verb. For example, assuming that the verb of the query is "won," result generation server 315 may identify instances of name-triggering information that are associated with the verbs "won," "win," "winning," "wins," and/or any other conjugation of the verb "win." In another implementation, result generation server 315 may identify only instances of name-triggering information that match the verb of the query exactly. Continuing with the above example and referring to the example information shown in FIG. 8, result generation server 315 may identify the name-triggering information, shown in entry 805, as being associated with the relation, since the information shown in entry 805 is associated with the verb of the relation.

Process 1000 may further include identifying a subset of data structures that store the object, or a term that is related to the object (block 1025). For example, name-triggering query confidence scoring module 625 of result generation server 315 may identify a subset of data structures that store a term that is related to the object and that are stored by the data structure repository, such as one or more devices implementing name-triggering information repository 615. In some implementations, result generation server 315 may identify all instances of name-triggering information, stored by the name-triggering information repository, that are associated with a term that is related to the object of the query. For example, if the object is "French Open," then the terms that are related to the object may include "sporting event, "tennis," "championship," and "game." In another implementation, result generation server 315 may identify only instances of name-triggering information that match the object exactly. In some implementations, the subset of data structures that store the object or a term that is related to the object is included in the set of data structures that store a form of the verb.

Process 1000 may additionally include determining a name triggering score for the query. The system may determine the name triggering score for the query based on the subset of the data. An example of determining a name-triggering score based on name-triggering information is described below with respect to process 1100 of FIG. 11.

Process 1000 may additionally include outputting a result based on the query and the name-triggering score. An example of outputting a result based on the query and the name-triggering score is described below with respect to process 1200 of FIG. 12. As described above with respect to result output module 635, result generation server 315 may output the result to a user device, such as user device 305. User device 305 may output the result via text output, visual output, or any other type of output. User device 305 may format the result by, e.g., adding information, removing information, or modifying information associated with the result.

Figure 11:
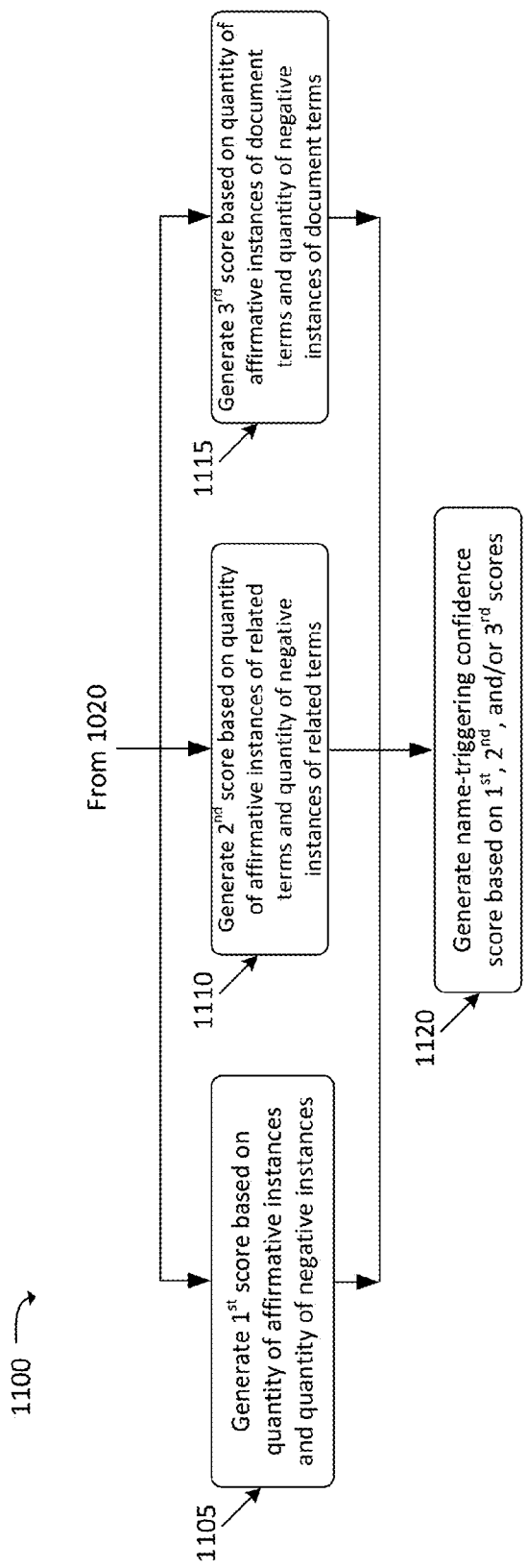
FIG. 11 illustrates a flowchart of an example process for generating a name-triggering score for a query, according to one or more implementations described herein.

FIG. 11 illustrates a flowchart of an example process 1100 for generating a name-triggering score for a query. As mentioned above, in some implementations, process 1100 may correspond to block 1030 of process 1000. In some implementations, process 1100 may be performed by result generation server 315. In another implementation, process 1100 may be performed by one or more other components instead of, or possibly in conjunction with, result generation server 315.

Process 1100 may include generating scores based on a quantity of affirmative instances and/or a quantity of negative instances. An affirmative instance may refer to an instance of occurrence of a term as an object in a relation, or a related term, that has a name of a person as a subject, and is associated with an object of the query. Assume, for example, that the received query includes the object "French Open." An occurrence of the term "French Open" in the example name-triggering information shown in FIG. 8, that indicates that the occurrence is associated with a name of a person, may be an example of an affirmative instance, as the term "French Open" matches the object of the query and the occurrence is associated with the name of a person. Additionally, the occurrence of the related term "tennis" may be an example of an affirmative instance, as the term "tennis" is related to the object of the query, and the occurrence of "tennis" is associated with the name of a person.

A negative instance may refer to an instance of occurrence of a term as an object in a relation, or a related term, that does not have a name of a person as a subject, and is associated with an object of the query. Assume, for example, that the received query includes the object "Super Bowl." An occurrence of the term "Super Bowl" in the example name-triggering information shown in FIG. 8, that indicates that the occurrence is not associated with a name of a person, may be an example of a negative instance, as the term "Super Bowl" matches the object of the query and the occurrence is not associated with the name of a person. Additionally, the occurrence of the related term "football" may be an example of a negative instance, as the term "football" is related to the object of the query, and the occurrence of "football" is not associated with the name of a person.

Process 1100 may include generating a first score based on a quantity of affirmative instances and a quantity of negative instances (block 1105). For example, assume that a received query, e.g., the query received at block 1005, includes the phrase "Who won the Super Bowl in 1992?" The verb of this example query is "won," and the object is "Super Bowl." Result generation server 315 may identify a total quantity of affirmative instances and a total quantity of negative instances in name-triggering information associated with the verb "won" and the object "Super Bowl." Referring to the example information shown in FIG. 8, result generation server 315 may identify the instances associated with the term "Super Bowl." Result generation server 315 may also identify the instances associated with the terms related to the term "Super Bowl"—e.g., "sporting event," "game," "football," and "championship." Thus, result generation server 315 may identify 33 affirmative instances (i.e., 3 affirmative instances of "sporting event"+16 affirmative instances of "game"+15 affirmative instances of "championship") and 39 negative instances (i.e., 10 negative instances of "Super Bowl"+4 negative instances of "sporting event"+8 negative instances of "game"+10 negative instances of "football"+7 negative instances of "championship").

In some implementations, result generation server 315 may generate the first score based on all of the identified affirmative and negative occurrences. In another implementation, result generation server 315 may generate the first score based on fewer than all of the identified affirmative and/or negative occurrences. For example, result generation server 315 may generate the first score based on affirmative and/or negative occurrences associated with up to a maximum quantity of terms. In such implementations, assume that result generation server 315 may generate the first score based on a maximum of three terms. Result generation server 315 may generate the first score based on up to the three terms associated with the highest quantity of affirmative occurrences and based on up to the three terms associated with the negative quantity of affirmative occurrences. For instance, result generation server 315 may generate the first score based on 34 affirmative instances (i.e., 3+16+15), and based on 28 negative instances (i.e., 10+10+8).

Additionally, or alternatively, result generation server 315 may identify up to a maximum quantity of occurrences per term. For example, assume that that maximum quantity of occurrences per term is 10. In this example, and referring to the example information shown in FIG. 8, result generation server 315 may identify 23 affirmative occurrences (i.e., 3+10+10) and 39 negative occurrences (i.e., 10+4+8+10+7).

In order to generate the first score, result generation server 315 may use any operation that is based on the quantities of affirmative and negative instances. For example, the first score may be generated using the example operation $A/(A+N)$, where A is the quantity of affirmative instances and N is the quantity of negative instances. Assume that the quantity of affirmative instances is 34, and that the quantity of negative instances is 39. In this implementation, the first score may be approximately 0.47 (i.e., 34/(34+39)). While an example operation was described above, the first score may be calculated using any operation, such as $N/(A+N)$; $A/(A-N)$; $N/(A-N)$; $A/(N-A)$; $N/(N-A)$; $\log(1+A/(A+N))$; $N-A$; $A-N$; $[N-A]$; or any other operation.

Process 1100 may further include generating a second score based on a quantity of affirmative instances of related terms and a quantity of negative instances of related terms (block 1110). Referring to the example information shown in FIG. 8, result generation server 315 may identify affirmative instances and negative instances associated with related terms, but not terms that were identified in documents. For example, result generation server 315 may generate the second score based on the instances of the terms "sporting event," "game," "football," "championship," and "tennis," but not based on the instances of the terms "Super Bowl" or "French Open." Continuing with the example query of "Who won the Super Bowl in 1992?", and in such implementations, result generation server 315 may generate the second score based on 34 affirmative instances (i.e., 3 affirmative instances of "sporting event"+16 affirmative instances of "game"+15 affirmative instances of "championship") and 29 negative instances (i.e., 4 negative instances of "sporting event"+8 negative instances of "game"+10 negative instances of "football"+7 negative instances of "championship").

Similar to the discussion above, result generation server 315 may omit certain quantities when identifying quantities of affirmative and/or negative occurrences. In order to generate the second score, result generation server 315 may use any operation that is based on the quantities of affirmative and negative occurrences of related terms. For example, the second score may be generated using the example operation $A_r/(A_r+N_r)$, where $A_r$ is the quantity of affirmative occurrences of related terms and $N_r$ is the quantity of negative instances of related terms. Assume that the quantity of affirmative instances of related terms is 34, and that the quantity of negative instances of related terms is 29. In this example, the second score may be approximately 0.54 (i.e., 34/(34+29)). While an example operation was described above, the second score may be calculated using any operation, such as $N_r/(A_r+N_r)$; $A_r/(A_r-N_r)$; $N_r/(A_r-N_r)$; $A_r/(N_r-A_r)$; $N_r/(N_r-A_r)$; $N_r-A_r$; $A_r-N_r$; $[N_r-A_r]$; or any other operation.

Process 1100 may additionally include generating a third score based on a quantity of affirmative instances of document terms and a quantity of negative instances of document terms (block 1115). A document term may be a term that was identified in a document, e.g., by relation extraction module 515.

Referring to the example information shown in FIG. 8, result generation server 315 may identify affirmative instances and negative instances associated with document terms, but not terms that are related to the document terms. For example, result generation server 315 may generate the third score based on the instances of the terms "Super Bowl" or "French Open," but not based on the terms "sporting event," "game," "football," "championship," or "tennis." Continuing with the example query of "Who won the Super Bowl in 1992?", result generation server 315 may generate the third score based on 0 affirmative occurrences of the term "Super Bowl" and 10 negative occurrences of the term "Super Bowl."

Similar to the discussion above, result generation server 315 may omit certain quantities when identifying quantities of affirmative and/or negative occurrences. In order to generate the third score, result generation server 315 may use any operation that is based on the quantities of affirmative and negative instances of document terms. For example, the third score may be generated using the example operation $A_d/(A_d+N_d)$, where $A_d$ is the quantity of affirmative instances of document terms and $N_d$ is the quantity of negative instances of document terms. Assume that the quantity of affirmative occurrences of document terms is 0, and that the quantity of negative occurrences of document terms is 10. In this implementation, the third score may be 0 (i.e., 0/(0+10)). While an example operation was described above, the third score may be calculated using any operation, such as $N_d/(A_d+N_d)$; $A_d/(A_d-N_d)$; $N_d/(A_d-N_d)$; $A_d/(N_d-A_d)$; $N_d/(N_d-A_d)$; $N_d-A_d$; $A_d-N_d$; $[N_d-A_d]$; or any other operation.

Process 1100 may also include generating a name-triggering score based on the first, second, and/or third scores (block 1120). In some implementations, result generation server 315 may generate the name-triggering score by performing a weighted average of the first, second, and third scores. In one such implementation, result generation server 315 may calculate the weighted average using the formula $(a*S_1+b*S_2+c*S_3)/d$, where a, b, c, and d represent numerical values, $S_1$ represents the first score, $S_2$ represents the second score, and $S_3$ represents the third score. In some implementations, a, b, and c are different values. For example, c may be greater than a, and a may be greater than b. In another implementation, one or more of a, b, and/or c may be equal. In some implementations, d may be a value, such as 3. In other implementations, d may be any other value, such as 0.3, 5, 30, 100, etc.

While one example formula was described above for generating the name-triggering score, any other mathematical operation may be used when generating the name-triggering score. For example, result generation server 315 may calculate a sum, a product, a dividend, a mean, a median, a maximum, or a minimum, and/or perform any other operation based on the first, second, and/or third scores in order to generate the name-triggering score. Furthermore, while an example was provided above that generates the name-triggering score based on all of the first, second, and third scores, in other implementations, result generation server 315 may omit one or more of the first, second, or third scores when generating the name-triggering score. For example, in some situations, one or more of the first, second, or third scores may be an undefined value, as a divisor when generating one or more of the first, second, or third scores may be zero. In such situations, result generation server 315 may omit one or more of the first, second, or third scores when generating the name-triggering score.

Figure 12:
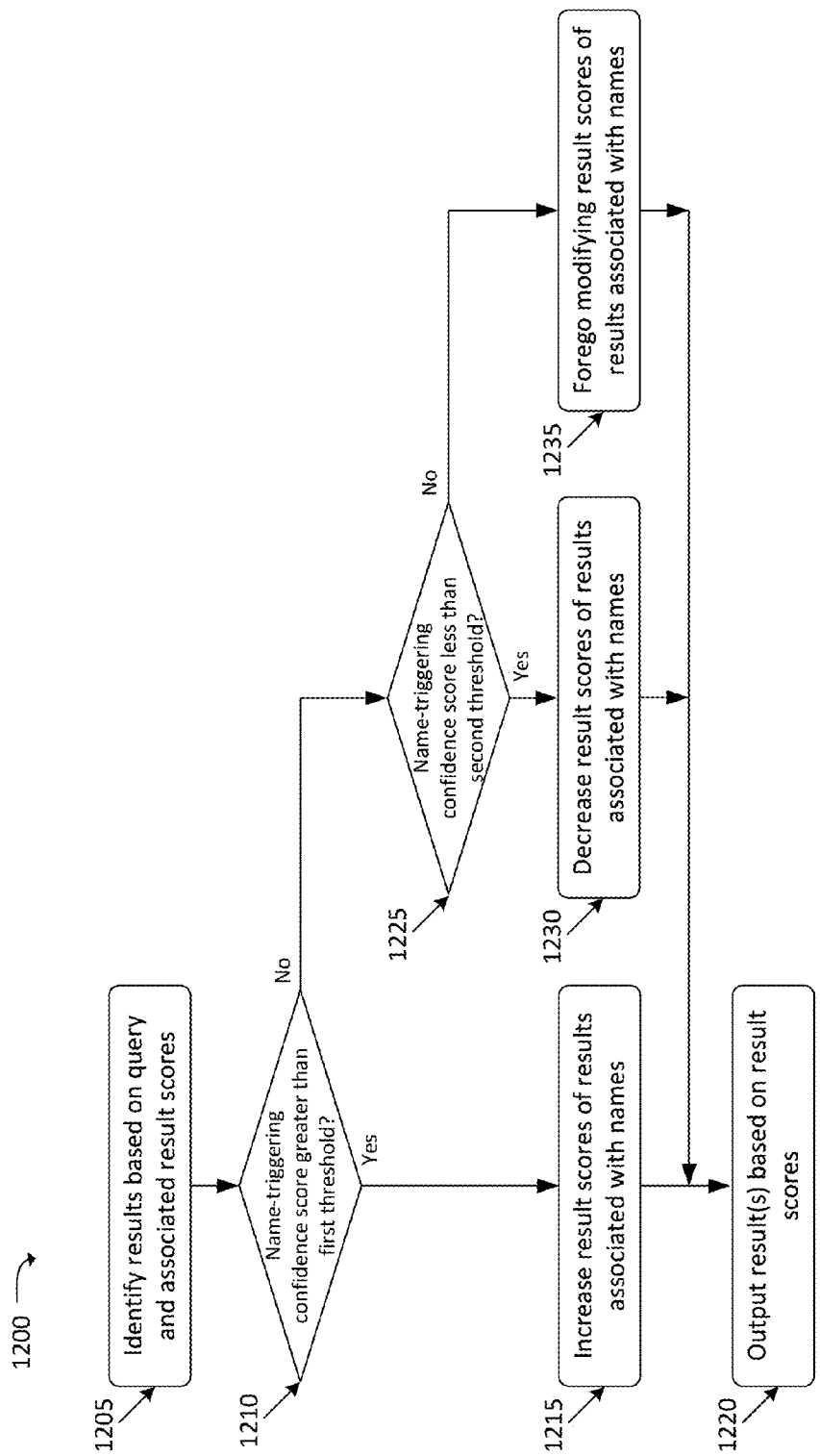
FIG. 12 illustrates a flowchart of an example process for using a name-triggering score to output a result that is responsive to a query, according to one or more implementations described herein.

FIG. 12 illustrates a flowchart of an example process 1200 for using a name-triggering score to output a result that is responsive to a query. As mentioned above, process 1200 may correspond to block 1030 of process 1000. In some implementations, process 1200 may be performed by result generation server 315. In another implementation, process 1200 may be performed by one or more other components instead of, or possibly in conjunction with, result generation server 315.

Process 1200 may include identifying results based on a query and associated result scores (block 1205). For example, as described above with respect to result output module 635, result generation server 315 may identify one or more results that are responsive to a query—e.g., the query received at block 1005 of process 1000. Result generation server 315 may also identify scores associated with the results. As also described above, these scores may be based on a measure of relevance of the results to the query, a measure of quality of the results, and/or one or more other characteristics of the results.

Process 1200 may further include determining whether a name-triggering score is greater than a first threshold (block 1210). For example, result generation server 315 may determine whether a name-triggering score associated with the query, e.g., a name-triggering score generated at block 1025 of process 1000 and/or block 1120 of process 1100, is above a first threshold.

If the name-triggering score is greater than the first threshold (block 1210—YES), then process 1200 may include increasing result scores of results associated with names (block 1215). For example, assume that the query is "Who won the French Open?", and the name-triggering score is greater than the first threshold. Result generation server 315 may identify results, out of the results received at block 1205, that are associated with a name of a person, and increase the scores associated with the results based on identifying that the name-triggering score is greater than the first threshold. For example, result generation server 315 may increase the scores associated with these results by 1%, 50%, 100%, 150%, or any other amount. Additionally, or alternatively, result generation server 315 may decrease the scores associated with results, that were not identified as being associated with a name of a person, by 1%, 50%, 100%, 150%, or any other amount.

Process 1200 may also include outputting one or more results based on result scores associated with the one or more results (block 1220). For example, result generation server 315 may identify a result with a highest score. In some situations, the result with the highest score may be a result for which a score was increased at block 1215. For example, assume that prior to block 1215, a result with the highest score was "tennis racquet," and a result with the second-highest score was "Rafael Nadal." After adjusting the scores, the result with the highest score may be "Rafael Nadal." Thus, in this example, result generation server 315 may output the result "Rafael Nadal" instead of "tennis racquet."

If, on the other hand, the name-triggering score is not greater than the first threshold (block 1210—NO), then process 1200 may include determining whether the name-triggering score is less than a second threshold (block 1225). If the name-triggering score is less than the second threshold (block 1225—YES), then process 1200 may include decreasing result scores of results associated with names (block 1215).

For example, assume that the query is "Who won the Super Bowl in 1992?", and the name-triggering score is less than the second threshold. Result generation server 315 may identify results, out of the results received at block 1205, that are associated with a name of a person, and decrease the scores associated with the results based on identifying that the name-triggering score is less than the second threshold. For example, result generation server 315 may decrease the scores associated with these results by 1%, 50%, 100%, 150%, or any other amount. Additionally, or alternatively, result generation server 315 may increase the scores associated with results, that were not identified as being associated with a name of a person, by 1%, 50%, 100%, 150%, or any other amount.

Process 1200 may also include outputting one or more results based on result scores associated with the one or more results (block 1220). For example, result generation server 315 may identify a result with a highest score. Assume, for example, that prior to block 1230, a result with the highest score was "Mark Rypien," and a result with the second-highest score was "The Washington Redskins." After adjusting the scores, the result with the highest score may be "The Washington Redskins." Thus, in this example, result generation server 315 may output the result "The Washington Redskins" instead of "Mark Rypien."

If the name-triggering score is not greater than the first threshold (block 1210—NO) and the name-triggering score is not less than the second threshold (block 1225—NO), then process 1200 may include foregoing modifying result scores of results associated with names (block 1235). Such a situation may occur when it is ambiguous as to whether the appropriate response to a query is the name of a person. For example, such a situation may occur for the example query "Who won last night's game?"

Process 1200 may also include outputting one or more results based on result scores associated with the one or more results (block 1220). For example, result generation server 315 may output a result with a highest score, of the scores identified at block 1205.

Implementations, described herein, may allow one or more devices to identify name-triggering queries. Accordingly, one or more devices may receive a query, and identify whether an appropriate response to the query includes a person's name. The one or more devices may provide a response to the query based on whether the query is a name-triggering query. Thus, according to implementations described herein, one or more devices may be able to provide appropriate answers to questions that may potentially be associated with a person's name.

The foregoing description provides illustration and description, but is not intended to be exhaustive or to limit the implementations to the precise form disclosed. Modifications and variations are possible in light of the above description or may be acquired from practice of the implementations. For example, while series of blocks have been described with regard to FIGS. 9-12, the order of the blocks may be modified in other implementations. Further, non-dependent blocks may be performed in parallel.

Additionally, while some examples of scores and thresholds were provided above, in practice, other scores and/or thresholds are possible. For example, while in some implementations, a high name-triggering score, such as 1.0, 10, 100, or any other value, may indicate that a query is a name-triggering query, in an alternative implementation, a low name-triggering score, such as 0.01, −1.0, −10, −100, or any other value, may indicate that a query is a name-triggering query. As another example, instead of increasing a score of results associated with names, e.g., at block 1215, process 1200 may include decreasing a score of results associated with names when the name-triggering score is greater than the first threshold (at block 1210—YES).

Additionally, or alternatively, instead of determining whether a value is greater than a threshold, some implementations may include whether the value is less than the threshold. For example, at block 1210 of process 1200, some implementations may include determining whether the name-triggering score is less than the first threshold. Further, instead of determining whether a value is less than a threshold, some implementations may include whether the value is greater than the threshold. For example, at block 1225 of process 1200, some implementations may include determining whether the name-triggering score is greater than the second threshold.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method comprising:
   receiving a query;
   determining that the query includes two or more particular terms among query terms of the query;
   determining that the query terms of the query do not include a proper name;
   based on determining that the query includes two or more particular terms among the query terms of the query and based on determining that the query terms of the query do not include a proper name, determining whether the query is likely a name-triggering query or is not likely a name-triggering query, wherein a name-triggering query is a query whose associated query results are to be rescored to promote results that include a proper name of an individual;
identifying a response to the query based at least on determining whether the query is likely a name-triggering query or is not likely a name-triggering query; and
providing the response to the query.

2. The method of claim 1, wherein determining whether the query is likely a name-triggering query or is not likely a name-triggering query comprises:
determining that the two or more particular terms among query terms of the query include an object and a verb;
determining a name-triggering score based on the object and the verb; and
determining that the query is likely a name triggering query based further on the name-triggering score satisfying a threshold.

3. The method of claim 2, wherein determining a name-triggering score based on the object and the verb comprises:
determining a first score based on a quantity of data items that store a form of the verb and that store the object and based on a quantity of the data items that store a form of the verb and that store a term that is related to the object;
determining a second score based on a quantity of the data items that store a form of the verb and that store the object and not based on a quantity of the data items that store a form of the verb and that store a term that is related to the object;
determining a third score not based on a quantity of the data items that store a form of the verb and that store the object and based on a quantity of the data items that store a form of the verb and that store a term that is related to the object; and
determining the name-triggering score by combining the first score, the second score, and the third score.

4. The method of claim 3, wherein determining the name-triggering score comprises:
calculating a weighted average of the first score, the second score, and the third score, wherein at least two of the first score, the second score, and the third score are associated with different weights.

5. The method of claim 4, wherein:
the first score is associated with a first weight, the second score is associated with a second weight, and the third score is associated with a third weight,
wherein the second weight is greater than the first weight, and
wherein the first weight is greater than the third weight.

6. The method of claim 1, wherein identifying a response to the query comprises:
identifying, in an index, a data item that identifies a document and the two or more particular terms among query terms of the query; and
designating the document as the response to the query.

7. The method of claim 1, comprising:
identifying terms that are related to the two or more particular terms among query terms of the query; and
based on the terms that are related to the two or more particular terms among query terms of the query, determining that the query is likely a name-triggering query.

8. The method of claim 1, wherein the two or more particular terms include a verb and an object that are associated, in a collection of resources, with a person's name.

9. A system comprising:
one or more computers and one or more storage devices storing instructions that are operable, when executed by the one or more computers, to cause the one or more computers to perform operations comprising:
receiving a query;
determining that the query includes two or more particular terms among query terms of the query;
determining that the query terms of the query do not include a proper name;
based on determining that the query includes two or more particular terms among the query terms of the query and based on determining that the query terms of the query do not include a proper name, determining whether the query is likely a name-triggering query or is not likely a name-triggering query, wherein a name-triggering query is a query whose associated query results are to be rescored to promote results that include a proper name of an individual;
identifying a response to the query based at least on determining whether the query is likely a name-triggering query or is not likely a name-triggering query; and
providing the response to the query.

10. The system of claim 9, wherein determining whether the query is likely a name-triggering query or is not likely a name-triggering query comprises:
determining that the two or more particular terms among query terms of the query include an object and a verb;
determining a name-triggering score based on the object and the verb; and
determining that the query is likely a name triggering query based further on the name-triggering score satisfying a threshold.

11. The system of claim 10, wherein determining a name-triggering score based on the object and the verb comprises:
determining a first score based on a quantity of data items that store a form of the verb and that store the object and based on a quantity of the data items that store a form of the verb and that store a term that is related to the object;
determining a second score based on a quantity of the data items that store a form of the verb and that store the object and not based on a quantity of the data items that store a form of the verb and that store a term that is related to the object;
determining a third score not based on a quantity of the data items that store a form of the verb and that store the object and based on a quantity of the data items that store a form of the verb and that store a term that is related to the object; and
determining the name-triggering score by combining the first score, the second score, and the third score.

12. The system of claim 11, wherein determining the name-triggering score comprises:
calculating a weighted average of the first score, the second score, and the third score, wherein at least two of the first score, the second score, and the third score are associated with different weights.

13. The system of claim 12, wherein:
the first score is associated with a first weight, the second score is associated with a second weight, and the third score is associated with a third weight,
wherein the second weight is greater than the first weight, and
wherein the first weight is greater than the third weight.

14. The system of claim 9, wherein identifying a response to the query comprises:
- identifying, in an index, a data item that identifies a document and the two or more particular terms among query terms of the query; and
- designating the document as the response to the query.

15. The system of claim 9, wherein the operations further comprise:
- identifying terms that are related to the two or more particular terms among query terms of the query; and
- based on the terms that are related to the two or more particular terms among query terms of the query, determining that the query is likely a name-triggering query.

16. A non-transitory computer-readable medium storing software comprising instructions executable by one or more computers which, upon such execution, cause the one or more computers to perform operations comprising:
- receiving a query;
- determining that the query includes two or more particular terms among query terms of the query;
- determining that the query terms of the query do not include a proper name;
- based on determining that the query includes two or more particular terms among the query terms of the query and based on determining that the query terms of the query do not include a proper name, determining whether the query is likely a name-triggering query or is not likely a name-triggering query, wherein a name-triggering query is a query whose associated query results are to be rescored to promote results that include a proper name of an individual;
- identifying a response to the query based at least on determining whether the query is likely a name-triggering query or is not likely a name-triggering query; and
- providing the response to the query.

17. The medium of claim 16, wherein determining whether the query is likely a name-triggering query or is not likely a name-triggering query comprises:
- determining that the two or more particular terms among query terms of the query include an object and a verb;
- determining a name-triggering score based on the object and the verb; and
- determining that the query is likely a name triggering query based further on the name-triggering score satisfying a threshold.

18. The medium of claim 17, wherein determining a name-triggering score based on the object and the verb comprises:
- determining a first score based on a quantity of data items that store a form of the verb and that store the object and based on a quantity of the data items that store a form of the verb and that store a term that is related to the object;
- determining a second score based on a quantity of the data items that store a form of the verb and that store the object and not based on a quantity of the data items that store a form of the verb and that store a term that is related to the object;
- determining a third score not based on a quantity of the data items that store a form of the verb and that store the object and based on a quantity of the data items that store a form of the verb and that store a term that is related to the object; and
- determining the name-triggering score by combining the first score, the second score, and the third score.

19. The medium of claim 18, wherein determining the name-triggering score comprises:
- calculating a weighted average of the first score, the second score, and the third score, wherein at least two of the first score, the second score, and the third score are associated with different weights.

20. The medium of claim 16, wherein identifying a response to the query comprises:
- identifying, in an index, a data item that identifies a document and the two or more particular terms among query terms of the query; and
- designating the document as the response to the query.

21. The medium of claim 16, wherein the operations further comprise:
- identifying terms that are related to the two or more particular terms among query terms of the query; and
- based on the terms that are related to the two or more particular terms among query terms of the query, determining that the query is likely a name-triggering query.

* * * * *